United States Patent [19]
Maier

[11] Patent Number: 5,160,232
[45] Date of Patent: Nov. 3, 1992

[54] DRILL BIT OR END MILL WITH GROOVED FLUTES

[75] Inventor: Andreas Maier, Schwendi-Hörenhausen, Fed. Rep. of Germany

[73] Assignee: MCA Micro Crystal AG, Allstatten, Switzerland

[21] Appl. No.: 647,038

[22] Filed: Jan. 28, 1991

Related U.S. Application Data

[63] Continuation-in-part of Ser. No. 372,355, filed as PCT/DE88/00531, Aug. 31, 1988, abandoned.

[30] Foreign Application Priority Data

Sep. 10, 1987 [DE] Fed. Rep. of Germany ....... 3730378

[51] Int. Cl.$^5$ .............................................. B23B 51/02
[52] U.S. Cl. ...................................... 408/223; 407/54; 408/230
[58] Field of Search ............... 408/223, 224, 227, 230; 407/53, 54

[56] References Cited
U.S. PATENT DOCUMENTS

| | | | |
|---|---|---|---|
| 599,537 | 2/1898 | Steudner | 408/223 |
| 750,537 | 1/1904 | Hanson | 408/230 |
| 867,639 | 10/1907 | Bragg | 408/223 |
| 1,069,930 | 8/1913 | Down | 408/223 |
| 1,384,733 | 7/1921 | Woods | 408/223 |
| 2,646,701 | 7/1953 | Letien | 408/223 |
| 2,769,355 | 11/1956 | Crisp | 408/230 |

FOREIGN PATENT DOCUMENTS

| | | | |
|---|---|---|---|
| 3826239 | 2/1990 | Fed. Rep. of Germany | 408/230 |
| 1502228 | 8/1989 | U.S.S.R. | 408/223 |

*Primary Examiner*—Daniel W. Howell
*Attorney, Agent, or Firm*—Herbert Dubno; Andrew Wilford

[57] ABSTRACT

A cutting tool in the form of a drill bit or end-milling tool has an elongated body formed with at least one cutting edge defined by a flank of a flute running primarily along a rotation axis of the body and having leading and trailing flanks one of which is formed with wavelike and spaced projections and recesses. The depth of these grooves and, hence, the height of the projections increases toward the end cutting edge to break up chips.

18 Claims, 8 Drawing Sheets

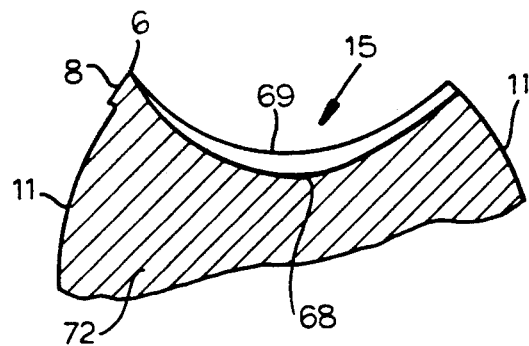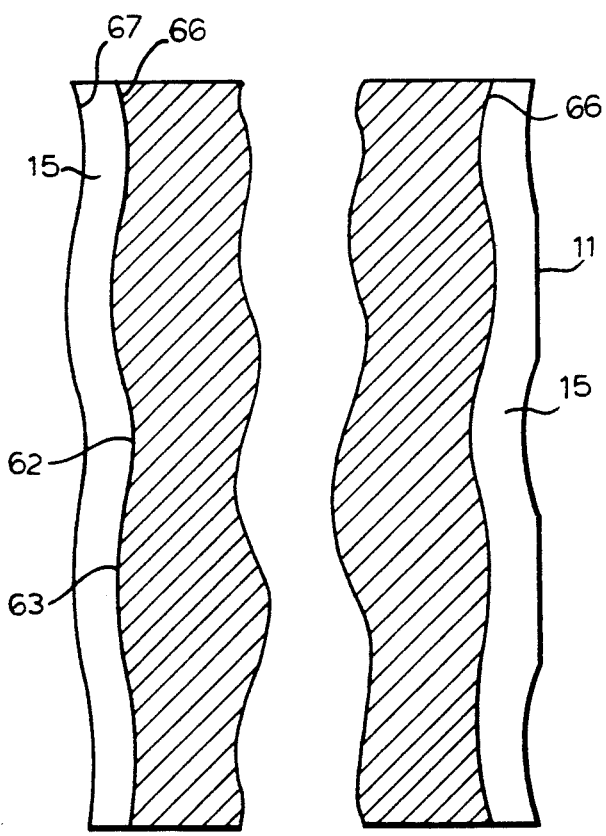
FIG.23
FIG.22a FIG.22 FIG.24 FIG.25

DRILL BIT OR END MILL WITH GROOVED FLUTES

CROSS-REFERENCE TO RELATED APPLICATIONS

This application a continuation-in-part of patent application 07/372,355 (now abandoned) filed Jun. 16, 1989 as the national phase of PCT/DE 88/00 531 which is based in turn on German application P 37 30 378.3 filed Sep. 10, 1987 under the National Convention.

FIELD OF THE INVENTION

The present invention relates to a machine cutting tool. More particularly this invention concerns a drill bit or an end mill having an end cutting edge and at least one flute opening and in fact defining this edge.

BACKGROUND OF THE INVENTION

In cutting tools of the above-defined kind, usually the flank of the flute has a smooth surface. Thus the tool has a maximal contact surface with the chips that are heated during the cutting process, and as a result is constantly being heated to an increasing degree. In addition the large contact surface cause greater wear which affects at least the secondary cutting edges The life of the tool is shortened and the quality of the workpiece surface produced by machining is lowered. Hence the efficiency of heavy-duty tools of hard metal, ceramic material, and of extra-hard cutting materials is reduced.

All this disadvantageously affects standard shank drills as well as end-mill cutters and like tools, and is particularly noticeable in the case of drill-milling cutters, i.e. in tools such as have been used lately for drilling and milling operations in order to avoid tool replacements. A primary field of application is the processing of so-called sandwich or composite materials of the type used in the electronic field, particularly for printed circuit boards.

OBJECTS OF THE INVENTION

It is therefore an object of the present invention to provide an improved drill bit or end mill.

Another object is the provision of such an improved drill bit or end mill having a flute which overcomes the above-described disadvantages, that is which has a long service life and that stays sharp.

SUMMARY OF THE INVENTION

In order to attain this object, the flute, at least on one portion of its flanks, is provided in a wave-like fashion with spaced-apart projections and/or recesses, whose depth increases toward the cutting edge. Thus the chips are in contact only with the outwardly rising projections. As a result, the contact surface, the direct heat transfer, the heating of the tool and the friction are considerably diminished These improvements increase the efficiency and life of the tool, providing improved surface quality and also dimensional precision.

In accordance with a first embodiment of the invention, the recesses and projections are arranged longitudinally with respect to the flute, and are shaped as guide grooves reaching into the cutting edge and as guide ribs running therealong. First of all, here, due to the guide ribs, a direction is imparted to the movement of the chips in the longitudinal direction of the flute, and in the case of twist drills, the direction is the helical path.

Further, due to the guide-rib arrangement running in and through the cutting edge, optionally chip-breaking grooves are formed. The width of the chips is thereby considerably reduced. These break mostly during the cutting process, transversely to the cutting edge, as a rule transversely to the primary cutting edge, or shortly thereafter in the flute. Also in the case of materials producing long chips, relatively short individual chips are obtained, which can be better controlled and removed as a mass. Mainly, in this way flying chips and winding chips which tend to coil around the drill during machining are avoided. A special advantage of the invention is that it is possible to use cutting tools with conventional sharpness, and which can be resharpened at low cost.

However, a large number of guide grooves and guide ribs is required only in the case of a relatively large length of drill bit or end mill along the flute flank. In borderline cases it is even possible to manage with a single groove which conducts and takes up the heat with its two side edges. From the basic body of the tool, the heat can always be extracted over short cuts and the guide ribs can be cooled down at their contact point with the flute flanks by cooling liquids and cooling air, as is known.

As a rule, the guide ribs can run over the entire length of the flute. But it is also possible to have some of them or all of them run for shorter lengths, since the main problem is to be solved in the area of the cutting edge. Under any circumstances they get deeper as they approach the end cutting edge.

The cross-section profile of the guide grooves and or the profile of the cutting edges can be asymmetric, according to need, so that the guide ribs and/or the guide grooves are arranged in such a manner that the individual cutting areas of the cutting edges overlap and their cutting moments have the same value.

At this time, a cross-section profile of the flute flanks with particularly continuously running, smooth-surfaced and wave-like boundaries is preferred. In this manner the contact surface is somewhat enlarged with respect to the edge guiding, and so is the friction, but the uniformity of the guiding is improved.

Basically, particularly on the flanks of the same flute, it is possible to provide guide-groove profiles with various cross section, optionally also with various arrangements. Further, the cross section of at least one guide rib can be periodically alternatingly increased or decreased, in its longitudinal direction, particularly close to the main cutting edge. It can get wider or narrower, so that generally the average cross section decreases gradually after the chips have left the guide groove to a large extent with increasing distance from the cutting edge.

Hence the wavelength, that is the spacing between adjacent mutually corresponding groove cross sections, can increase with the distance from the primary cutting edge. The guide groove can present concavely shaped bottom segments which can each form a depression which rises up to the edge of the guide groove. Neighboring bottom segments can be joined by forming wedge-like sharp cutting edges, and separate, all-around enclosed depressions can be provided at a distance from each other, forming thereby an intermittently interrupted guide groove.

The intermittent rise of the groove floor or bottom serves primarily for imparting impulses to the chips in order to make them move outward so that a clogging or dirtying of the guide groove is prevented.

Further, the invention relates to a cutting tool, particularly a drill or milling cutter, with at least one circumferential cutting edge in conjunction with a flute running predominantly along the axis of rotation. In a further embodiment which overcomes the above-given disadvantages, the flute is provided at least on one portion of its flanks with recesses running transversely thereto and reaching up to the circumferential cutting edge.

In this way, during resharpening of the tool in a defined wear area it is possible to create identical or similar conditions at the circumferential edges as in the above-described embodiment at the frontal cutting edge. Thus the chips are removed without contact over the recesses provided transversely with respect to the flute, and bear only minimally against the surfaces between the recesses. As a result the resistance to guidance is minimal, while guiding is reliable.

These transversely running recesses are advantageously provided by the wave troughs of a wave formed at least in the true rake and consisting of wave crests and troughs, alternating in the longitudinal direction of the chip-breaking flute. They can be formed in the true rake passing through the bottom of the flute at least up to its back face particularly up to the adjacent secondary free faces.

The cross-section profile of the wave can be modified or not, on a larger section of its length. Preferably it is asymmetric, which further improves the chip flow.

For a further improvement of the chip flow, with reduced friction, the wave crests or the projections rising above the flute bottom between the transverse recesses can be provided with a saw-like teeth having a height which increases in the travel direction of the chips and then decreases sharply.

In this manner the flanks of the same flute can be equipped with wave profiles of various cross sections, and optionally, in various arrangements.

Since the action of the wave-like configuration of the flute decreases with the distance form the respective cutting edge, the height of the projections or waves can also decrease in the same sense.

Further, it is advisable to let the height of the projections over the recesses decrease at least from the middle of the flute toward the back.

According to a preferred embodiment of the invention, the recesses are formed by lengthwise enclosed depressions which are separated from each other by bridge-like rises arranged transversely to the longitudinal direction of the flute. In this depression, lubricants and cooling media can collect, which results in a better handling of the chips.

Preferably, the recesses serving as chip-breaking flutes have at least one lateral edge whose cutting direction is approximately transverse to the direction of the circumferential cutting edge. If possible, the chip-breaking flute or recess should also have at least one lateral edge running transversely to the direction of the flute or of the secondary cutting edge, particularly with rectangular cross section.

Finally, the invention relates to a process for the production of a cutting tool, particularly drill- and/or milling cutter as developed by the invention, with at least one circumferential cutting edge in conjunction with a flute running predominantly along the rotation axis, provided at least on one portion of its walling with recesses running transversely thereto and reaching up to the circumferential cutting edge, with at least one machining tool which is guided to adjust with respect to the workpiece.

According to the invention, the depth of the tool engagement at the workpiece in the area of the flute is intermittently changed. In this way, a variety of predetermined configurations can be achieved, in order to reduce friction and other phenomena and to obtain a higher tool quality with less effort, with an improved guiding of the chips. There are various possibilities for the formation of the recesses. For one, the radial distance between rotational axis of the workpiece and machining tool can be intermittently modified, also the circumferential arrangement between circumferential cutting edge and a tool. Further, the bearing axes of the workpiece and/or tool can be moved intermittently, in the sense of a change of the coordination of workpiece and tool.

Also, the basic shape of the flute can be imparted with a first tool and the wave formation in the flute can be done with a second tool. The tools can be optionally used alternatingly.

For instance, on the motion serving for the flute production, on the first tool a further intermittent motion component can be superimposed for the formation of the wave in the flute flank through this single tool.

Also, on the continuous rotational movement of a first tool serving for the production of the flute a swinging or oscillation motion about its rotational axis can be superimposed.

Alternatively, on the continuous advance serving for the production of the flute, between the workpiece and the first tool, a swinging or oscillating motion in a direction deviating from the direction of the flute, is superimposed.

Thereby, the tool can be moved oscillatingly or swingingly in the direction of its axis, back and forth. It is also possible to superimpose oscillation or swinging motions in various manners for the tool as well as the workpiece.

BRIEF DESCRIPTION OF THE DRAWING

The above and other objects, features, and advantages will become more readily apparent from the following, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIG. 22 is a longitudinal section taken along line XXII—XXII of FIG. 21;

FIG. 22a is a similar longitudinal section taken along line XXIIa—XXIIa of FIG. 21;

FIG. 23 is a cross section through a flute taken along line XXIII—XXIII of FIG. 21;

FIG. 24 is another longitudinal section through the center of a flute with transverse, narrow, and rectangular-section grooves;

FIG. 25 is a view like FIG. 24 but with flat, wide, and rectangular-section grooves;

SPECIFIC DESCRIPTION

Figure 1:
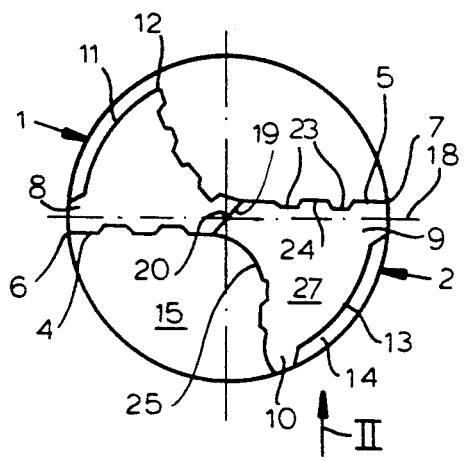
FIG. 1 is an axial end view of a double-edged twist drill according to the invention.
Figure 2:
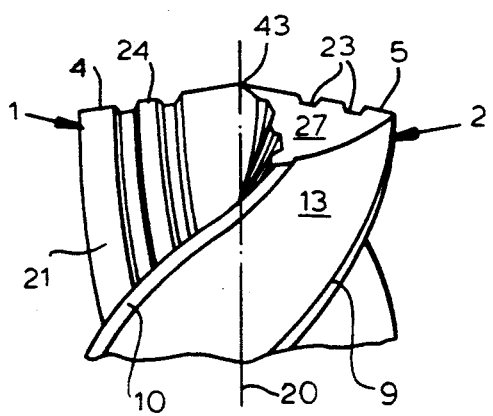
FIG. 2 is a partial side view of the tip of the FIG. 1 drill bit taken in the direction of the arrow II of FIG. 1.

As seen in FIGS. 1 and 2 a twist drill has two helical ridges 1 and 2 forming primary end cutting edges 4 and 5 and secondary side cutting edges 6 and 7 on each of which a guide ribs 8 or 9 is formed. In addition a third ribbed guide 10 is provided on the rib 2 that improves radial guiding of the bit during drilling and thereby damps the vibrations which occur during drilling. The ridge 1 has an outer face 11 that extends to a rear edge 12 of the ridge 1 while the ridge 2 has an outer face 13 that lies between the two guide ribs 9 and 10 and that defines a radially outwardly open flute 14 that in turn opens into a flute 15 of the bit starting at a certain distance from the drill point.

The two end cutting edges 4 and 5 lie in parallel axial planes symmetrically and spacedly flanking an axial median plane 18 passing through an axis 20 of the bit. A transverse cutting edge 19 connecting the two primary cutting edges 4 and 5 runs through the axis 20 of the bit.

Each ridge 1 and 2 has a rear or trailing surface partially defining the respective flute 15 that is formed starting from the two main cutting edges 4 and 5 with two identically shaped guide grooves 23 of flat trapezoidal cross section and enclosing between them two guide ribs 24 which again are of trapezoidally section. These grooves 23 are of a depth that decreases away from the cutting edges 4 and 5 so that the angular height of the ridges 24 similarly increases toward the cutting edges 4 and 5. The trapezoidal profiles of the primary cutting edges 4 and 5 ar each arranged symmetrically with respect to the drill axis 20. Thus both main cutting edges 4 and 5 run through the same rotation surface without advance.

A rake surface 21 and a back surface 25 form the flanks of each flute 15. In the back of the drill ridge 2 there are two trapezoidal guide grooves 23 and the back of the drill ridge 1 has three such grooves 23. From the point of view of forces, this asymmetric arrangement has almost no importance, since it serves solely for removing the chips after cutting from the main cutting edge 4 or 5 as much as possible in an even flow along a limited friction surface. The limits of the friction surface are defined here by the alternating guide grooves 23 and guide ribs 24, and due to the even transport of the chips a jamming thereof is avoided, relieving thereby the drill surface at the tool. The surface quality of the drill surface is improved. Since the guide grooves and ribs 23 and 24, which run parallel in the flute flanks, continue until they reach the primary cutting edge 4 and 5, they act there as chip-breakers. The normally wide and flat chip is subdivided mainly at the edges in the vicinity of the limits of the grooves 23 and ribs 24 into smaller individual chips, which during transportation back into the ever shallower grooves 23 break into shorter pieces, thereby facilitating the removal also by pneumatic means. In addition as a rule main free end surfaces 27 remain smooth so that by grinding these surfaces with conventional tools and devices the drill can be resharpened easily.

Figure 3:
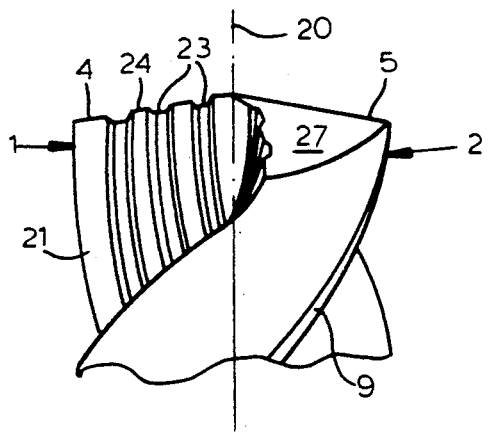
FIGS. 3, 4, and 5 are views like FIG. 2 of variants on the drill bit of FIGS. 1 and 2.

In the embodiment of FIG. 3, instead of two guide grooves 23, there are three such grooves.

Figure 4:
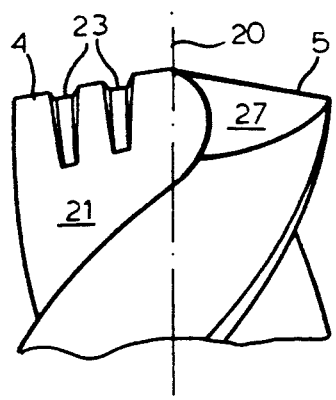
Figure 5:
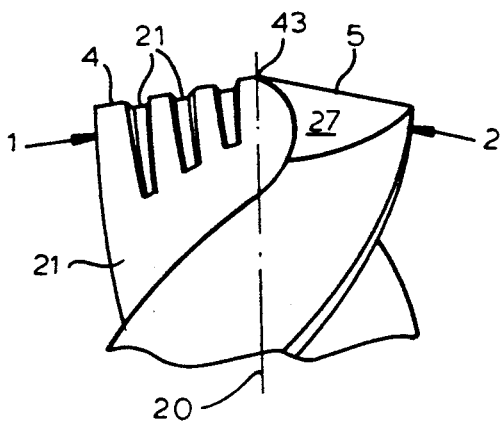

According to FIG. 4, two guide grooves 23 running into the rake surface 21 are shown, while in FIG. 5 there are three such guide grooves, all clearly tapering to zero depth at some distance back from the cutting edges 4 and 5. This makes clear that it is primarily a matter of the configuration of the cutting geometry in the immediate vicinity of the main cutting edge, with the depth of the guide grooves increasing as they come closer thereto. In this way materials producing long chips cannot jam in the area directly at o immediately behind the main cutting edge, causing the chips to wind around the bit.

Figure 6:
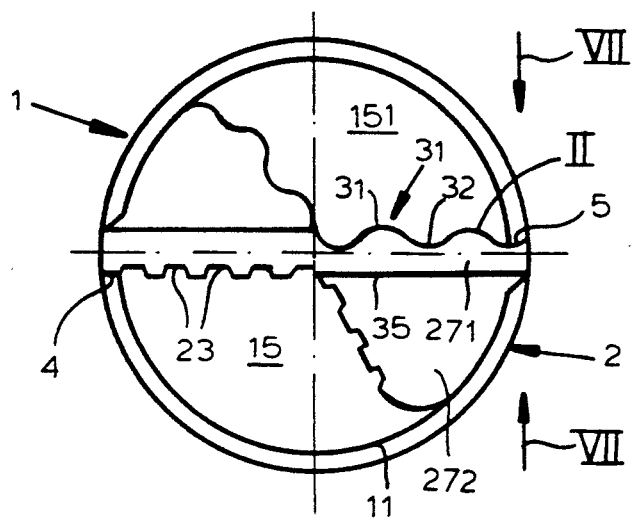
FIGS. 6 is an axial end view like FIG. 1 of a further embodiment of the invention.

In the embodiment of FIG. 6, in the flanks of the lower flute 15 smaller trapezoidal guide grooves 23 are formed while in the flanks of the upper flute 151 a larger sinusoidal wave-like formation 31 with wave troughs 32 and wave crests 33 is provided. The two main cutting edges 4 and 5 are in this way rendered asymmetric and care has to be taken that their two cutting moments are as much as possible balanced by adjusting the cross section of the chips. In addition there a first main free surface 271 is provided with a subsequent second main free surface 272 separated from the first by the edge 35.

Figure 7:
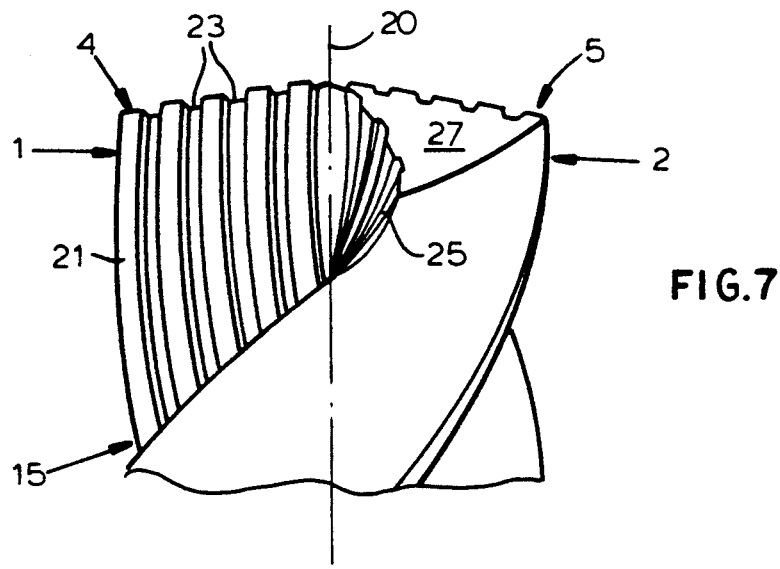
FIG. 7 is a side view of the tip of the FIG. 6 drill bit taken in the direction of the arrow VII of FIG. 6.

According to FIG. 7, in each of the rake surfaces 21 four trapezoidal guide grooves 23 are formed, again in a symmetric arrangement with respect to the drill axis 20, and the guide grooves of the back surface 25 also have a trapezoidal cross section.

Figure 8:
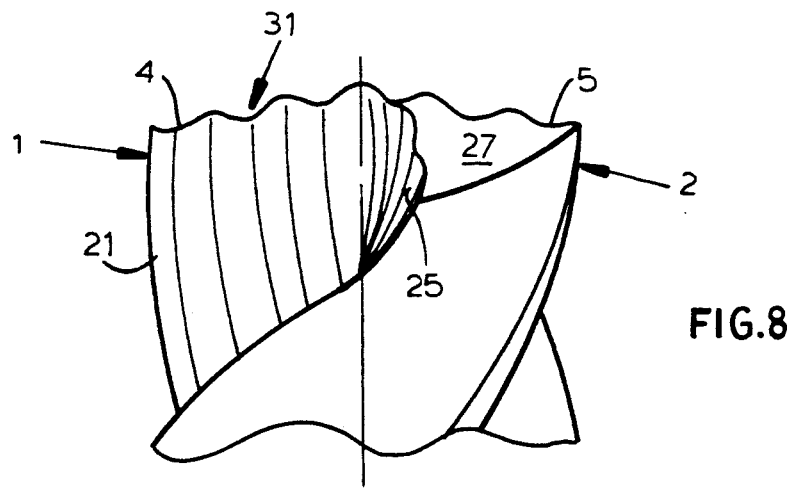
FIG. 8 is a variant of the embodiment of FIG. 7.

According to FIG. 8, the primary cutting edges 4 and 5 are also symmetrically designed. However here the flanks of the flute again have the shapes of a sinusoidal wave 31, also on the back surface 25.

Figure 9:
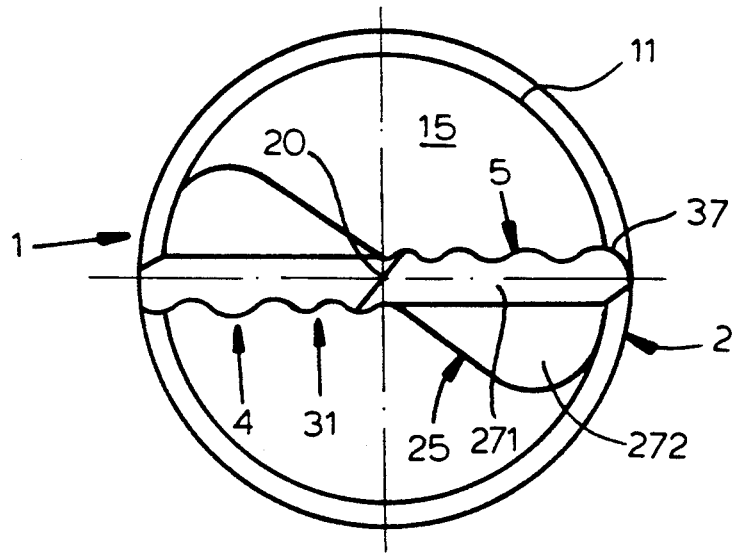
FIG. 9 is an end view of a further two-edge drill bit.

According to FIG. 9, the main cutting edges 4 and 5 are again formed as a sinusoidal wave whose wavelength increases from the axis 20 of the bit radially outward. However, the amplitude changes very little. This is different from FIG. 6 where the outer end of the main cutting edge 5 runs to a point since here the ends of the two main cutting edges, as well as the margins of the rake surfaces are rounded at 37.

Figure 10:
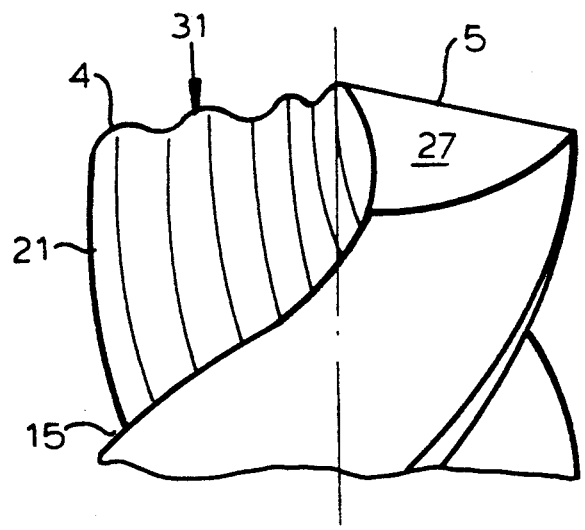
FIGS. 10, 11 and 12 are side views of variants on the drill bit of FIG. 9.

According to FIG. 10, the rake surface 21 of the flute 15 is provided with a wave 31 corresponding to FIG. 9 and the wavelength increases again outward as in FIG. 9 but even more markedly. In the case of the hidden flute such a wave is absent, so that the main cutting edge 5 is straight. The respective torsional cutting of the two cutting edges are normally constant. If this is not the case, here they also can be balanced.

Figure 11:
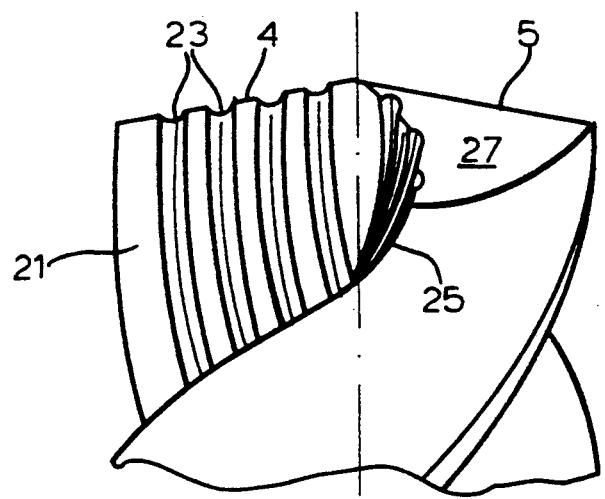

The embodiment of FIG. 11 differs from FIG. 7 first due to the different width of the inner and outer surface strips flanking the grooves 23. In addition the guide grooves 23 are not trapezoidal, but have a curved channel bottom, which can also have the shape of a compound curve.

Figure 12:
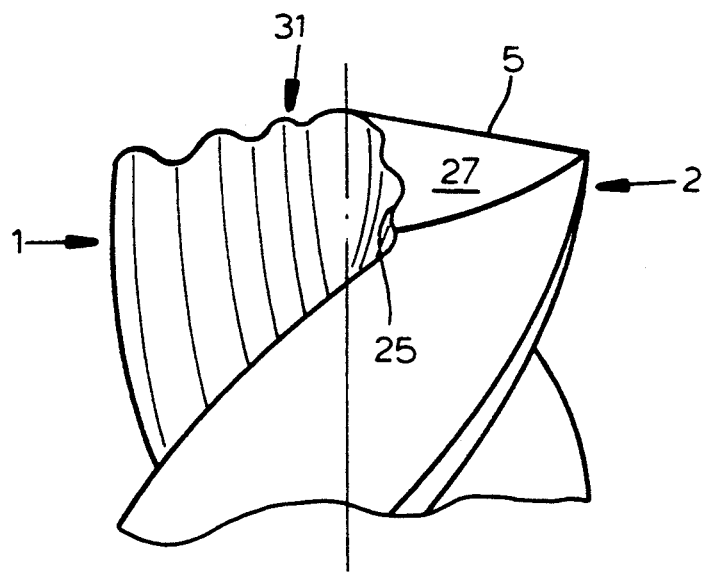

FIG. 12 corresponds largely to the embodiment of FIG. 10 with wave 31, which again reaches into the back surface 25. However, the main cutting edge 5 can again be rectilinear.

Figure 14:
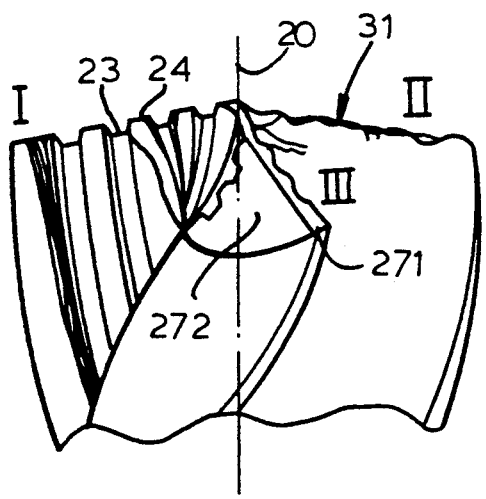
FIG. 14 is a side view of the drill bit taken in the direction of arrow XIV of FIG. 13.
Figure 13:
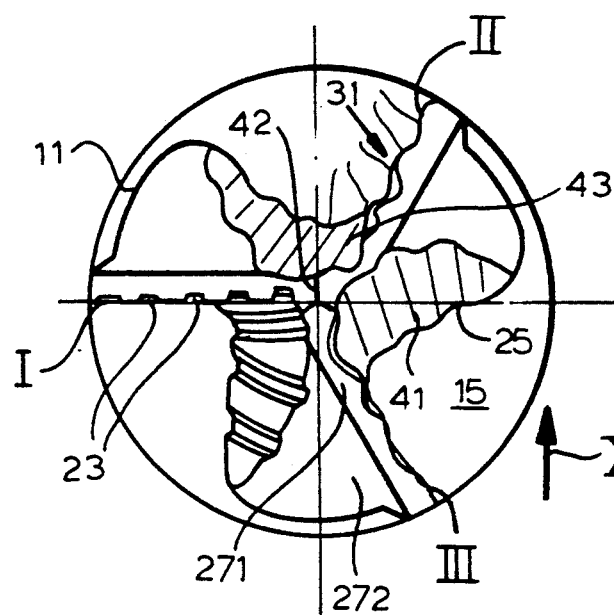
FIG. 13, is an end view of a three-edge drill bit according to the invention.

The twist drill shown in FIGS. 13 and 14, has three main cutting edges I, II and III, each with a first main free surface 271 and a second main free surface 272. In each back surface 25 of the flute 15, a pick-out flute 41 is formed, and from each of them, one of the three obtuse-angled cutting edges 42 arranged in a star-like pattern leads to the drill point 43 at the drill axis 20. As in all the other embodiments, the depth of the recesses and the height of the intervening ridges increases toward the end cutting edges.

In the flute 15 arranged in front of the main cutting edge I and in the thereto pertaining pick-out flute 41, the guide grooves 23 with a trapezoidal cross section are formed, at the main cutting edge II they are fashioned as a wave 31 with relatively small and changing wavelength, and at the main cutting edge III are fashioned as a wave with bigger and somewhat more uniform wave length. Thereby, the individual waves of the one cutting edge are offset with respect to the waves of the other, so that again the same moment load has to be taken up by all cutting edges. Sometimes, also the wave formation 31 is slightly irregular, partially barb-like, in order to achieve the desired moment balance.

Figure 15:
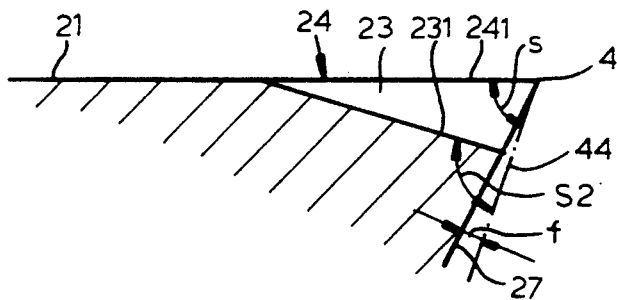
FIGS. 15 through 20 are longitudinal sections through the ends of various flutes adjacent the cutting edge.

FIG. 15 shows a longitudinal section through a development of a guide groove 23 according to FIG. 4, whereby the straight line 241 represents the top surface of the guiding rib 24 or of the stretched upper edge line of the guide groove 23. This line forms with the line 44 which illustrates the direction of the cutting motion at the main cutting edge 4, the rake angle s. From the main free surface 27, the line 44 is angularly offset by the main clearance angle f. By contrast, the rectilinear bottom surface 231 of the guide groove 23 forms the larger rake angle s2 with the line 44. Hence it is possible to work closely together with these two different rake angles s and s2, and thereby to produce differently shaped chips in the same immediate vicinity, but close together. The chips are therefore expelled right away, after a short distance at the outer end of the guide groove 23.

Figure 16:
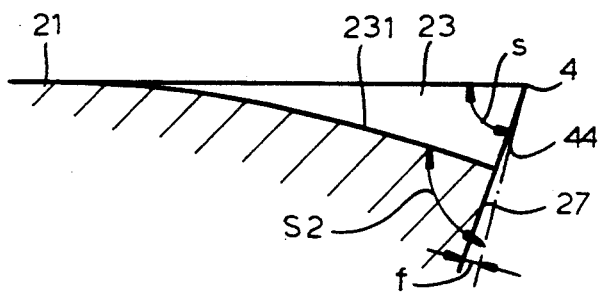

The rake angles s and s2 are taken over without modifications according to FIG. 16. The bottom 232 of the guide groove 23 is there convex, so that the distance to the point of chip expulsion is bigger.

Figure 17:
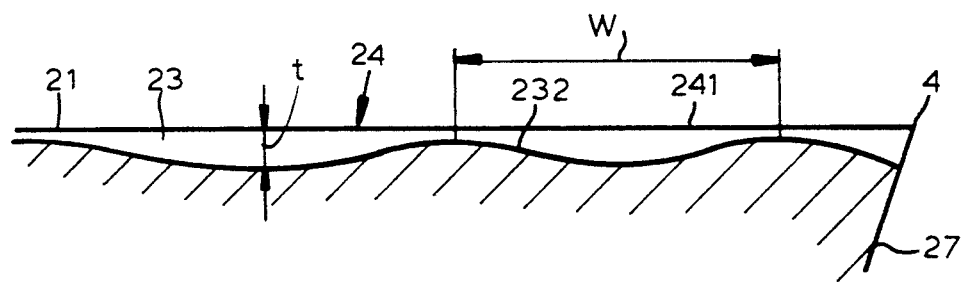

The same basic values are essentially preserved also in the embodiments of FIGS. 17 through 20, only in this case the bottom of the groove has a sinusoidal wave-like configuration. Thus from FIG. 17 it can be seen that the groove bottom 232 always remains below the edge line 24, and thereby within the guide groove 23. The outgoing portion of the wave-like bottom in the area of the rake 21 also corresponds largely with the representation in FIG. 16, but the wave starts before reaching the edge line 241, so that the wave length w increases more and more. The amplitudes can thereby remain constant, as shown in FIG. 17, but they also can decrease continuously, which is preferred at this time.

Figure 18:
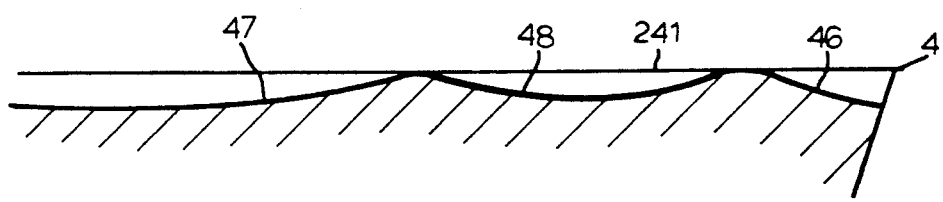

In FIG. 18, the initial part 46 of the wave-like bottom surface is already concave, and the wave crests 47 have considerably larger curvatures than the wave trough 48.

Figure 19:
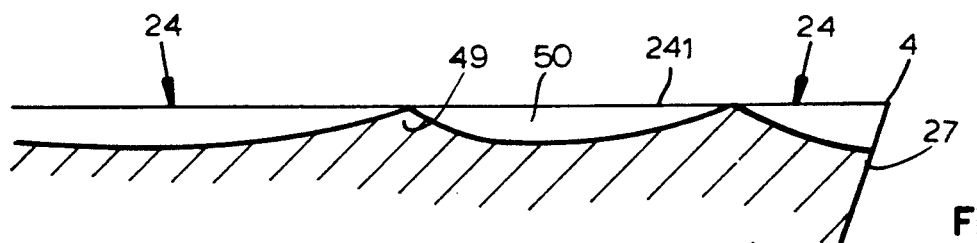

In FIG. 19, the wave crests are formed by sharp-edged wedge-like cutting edges 49, which also end in the edge line 241, thereby intermittently interrupting the guide groove and creating individual depressions 50 whose lengths increase continuously and whose depths can correspondingly decrease.

Figure 20:
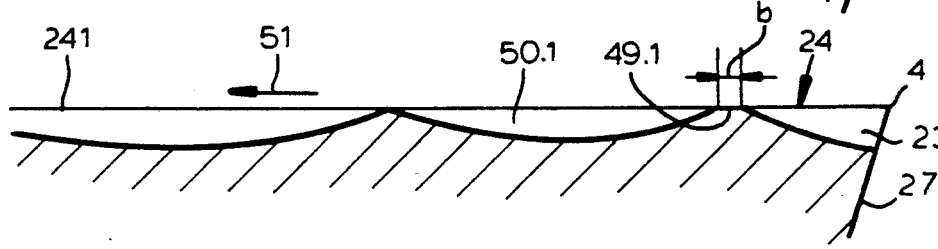

This is also shown in FIG. 20, where the depth t of the depressions 50.1 visibly decreases in the direction of the chip flow 51 and the wave crests are formed by sharp-edged obtuse-angled wedges whose widths b decrease in the direction of the chip flow 51. The special configuration of the guide groove 23 has again to be adjusted for the specific case to the tool, bit and the materials being machined and operational data, in order to insure an optimal chip removal with minimal tool load. Thus the depressions 50 act as cooling pockets which make possible an interim improved cooling of the chips.

Figure 21:
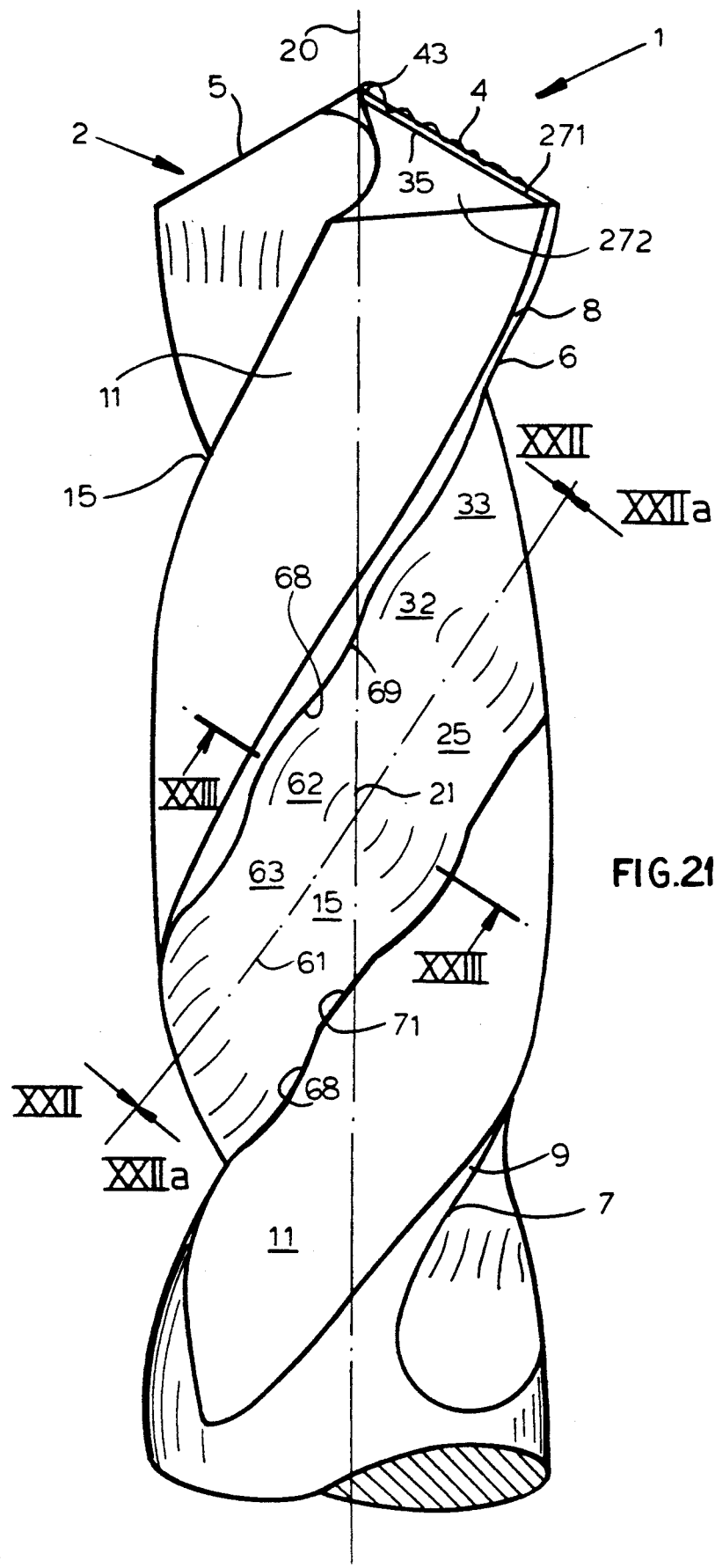
FIG. 21 is a side view of a drill bit with recesses formed in the flute transverse to its longitudinal direction so as to create chip-breaking flutes for circumferential cutting edges.

FIG. 21 shows a side view of a cutting tool in whose flutes spaced-apart transverse grooves are formed which together with the rises existing therebetween create a wave-like formation. In the cutting tool shown in FIG. 21, a twist drill or a twist milling cutter has flutes 15 extending along a spiral-shaped center line 61 and formed with spaced transverse grooves 62 and between them with projections in the shape of segmentary ribs 63.

The simplest embodiment of a transverse groove in the shape of segmentary grooves 62a with a rectangular cross section is shown in FIG. 25. In order to illustrate the spiral shape, the hidden lines of the groove edges 64 are there indicated in dash-dot lines 65.

In the embodiment of the transverse groove 62 according to FIGS. 21 and 22, the flute has a sinusoidally wavy bottom or floor 66. Comparable wave lines 67 result also in the circumferential cutting edge and in the secondary cutting edge 6. While the wave troughs 68 are equally well defined at the upper side and lower side of the flute, for the wave crests 69 this applies only to the upper secondary circumferential cutting edge 6. This is due to the larger diameter of the ribbed guide 8 with respect to the inwardly offset secondary or circumferential free surface 11. Also, chips formed at the circumferential cutting edge are subdivided in a somewhat similar manner and thereby broken, as happens at the main cutting edge according to the embodiments shown in FIGS. 1 to 12.

FIG. 23 also shows that the wave troughs 68 are more noticeably curved than the normal bottom of the flute 15, that is they have a smaller radius of curvature. Thus the sinusoidal wave can run without change all the way into the ribbed guide 8 while its other extremity ends in the back free surface 11 at an angular spacing. This leads then to the nonuniformity through a connection lines 71 in the lower wave line.

Such connection lines 71 which disturb the wave line can be avoided when the center plane of vibrations is slightly swung about the bit axis 20, out of the spiral surface running through the center line 61 of the flute 15.

As can be already understood from the rectangular shape of the transverse grooves 62 in FIGS. 24 and 25, neither the sinusoidal line nor a less accurate wave formation are indispensable. In principle, it is actually only a matter of a succession of recesses and projections, and the cross section has neither to be unchanged nor symmetric. It can change regularly or irregularly, as long as the cutting moments to be produced by the mutually coordinated cutting edges balance each other out or complete each other.

The height of the projections or the depth of the recesses can be modified in many ways. It is possible to form depressions enclosed by the recesses which do not even have to be connected to each other and can also take over the function of pockets for cooling and/or lubricating means.

Figure 27:
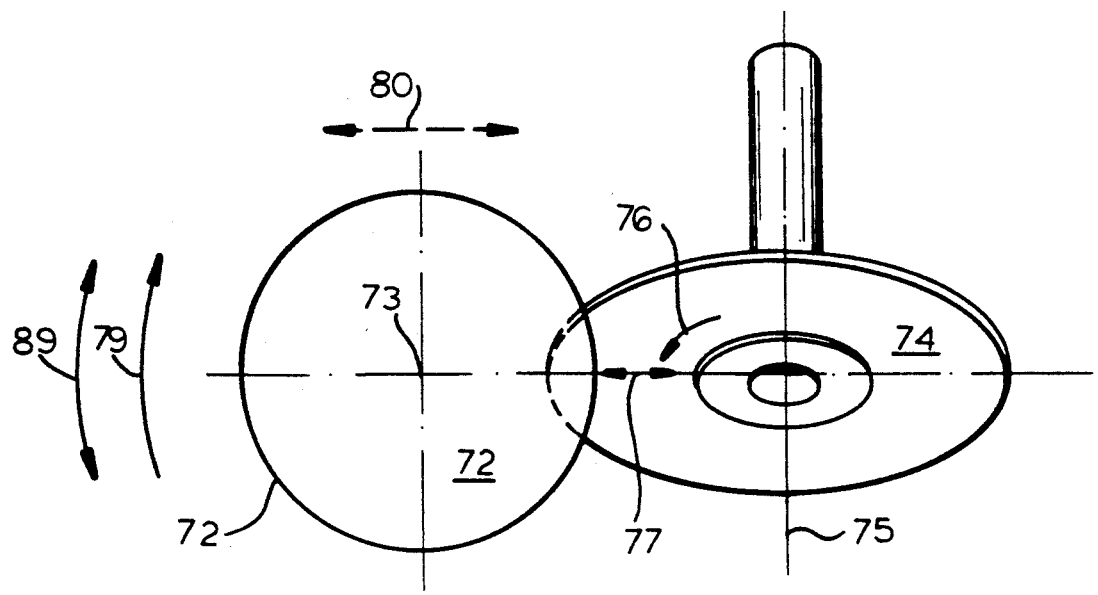
FIG. 27 is a view of this arrangement in FIG. 26, seen from the top.
Figure 26:
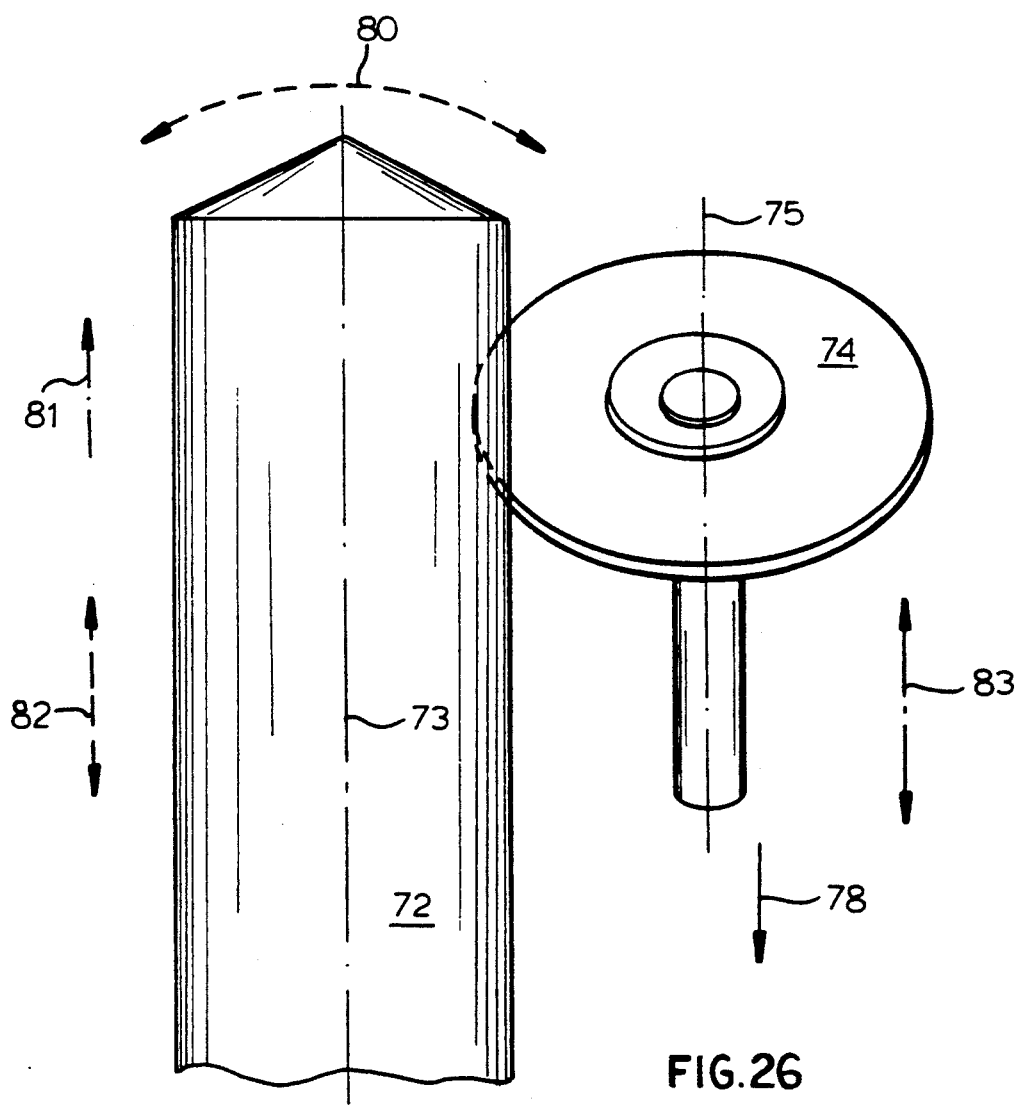
FIG. 26 is a schematic side view showing the workpiece and a first tool for cutting the inventive formations in its flute.

The production of the cutting tool shown in FIG. 21 can basically be carried out continuously. However, as a rule, it is simpler to carry out the various production steps separately, and optionally in succession. This will be clarified with the aid of FIGS. 26 and 27.

There, the bit is shown at 72 and is rotatable about a bit axis 73. The only represented tool 74 is a disk and can for instance be a side-milling cutter or a grinding wheel. It is rotatable about a tool axis 75, which does not have to be in a rigid spatial correlation with the bit axis 73.

The tool 74 serves normally for the shaping of the flute 15, to which end at first a rotation around its axis 75 according to arrow 76 is normally required. In addition a relative motion along the tool axis 73 or a swinging or rotational motion around this bit axis 73 and finally a controlled motion approximately radially to this axis are required.

The arrows of the normally provided types of motion are here drawn in solid lines. This is valid for the already mentioned arrow 76 referring to the rotation of the tool 74, further the radial control according to the double arrow 77 and the axial control of the tool according to the tool 78.

The tool would remain then only with continuous rotation according to arrow 79, for the control of the spiral ascent. It can also be periodically swung about the axis 73 in order to form zig-zag shaped recesses, such as the tool according to double arrow 89 in its axis 75.

Other possibilities are indicated with broken arrow lines.

So for instance, instead of the radial steering of the tool according to double arrow 77 the bit 72 can be deviated according to the double arrow 80. Further, it can be axially controlled instead of the tool, according to arrow 81 and according to arrow 82 it can be axially moved back and forth or oscillated, just as is the tool according to arrow 83.

The tool and/or the bit can then be moved oscillatingly back and forth according to the double arrow 82, 83. This can take place through swinging, but also through displacement or twisting according to double arrow 80. All this can be done with the single tool 74, for instance through twisting and swinging. The rule is here that from several motions to be performed concurrently, each component, tool or bit, performs at least one of these motions and that these motions are superimposed.

I claim:

1. A cutting tool in the form of a drill bit or end-milling tool comprising an elongated body formed with at least one cutting edge defined by a flank of a flute running helically relative to a rotation axis of the body and having leading and trailing flanks one of which is formed generally along its full length with wavelike, helical, and spaced ribs and a plurality of guide grooves, the depths of the grooves and heights of the ribs increasing toward the cutting edge.

2. The cutting tool defined in claim 1 wherein the grooves are formed in the leading flank of the flute.

3. The cutting tool defined in claim 2 wherein the guide grooves are also provided in the trailing flank of the flute adjacent a rake surface thereof.

4. The cutting tool defined in claim 1 wherein the profile of each of the guide grooves and the profile of the cutting edge is asymmetric seen parallel to the axis.

5. The cutting tool defined in claim 1 wherein taken perpendicular to a longitudinal axis of the body at least one guide groove has a trapezoidal cross section.

6. The cutting tool defined in claim 1 wherein at least one guide groove has relative to a longitudinal axis of the body a radially outwardly concavely curved channel bottom.

7. The cutting tool defined in claim 1 wherein one of the flanks of the one flute has at least partially a profile seen parallel to the axis with a continuous smooth wave formation.

8. The cutting tool defined in claim 1 wherein the depth of at least one guide groove is wavelike.

9. The cutting tool defined in claim 8 wherein the wavelength of the one groove between mutually corresponding groove cross-sections increases with the distance from the cutting edge.

10. The cutting tool defined in claim 8 wherein the bottom of the one groove has several bottom segments concavely curved in their longitudinal direction.

11. The cutting tool defined in claim 10 wherein marginal portions of the curved bottom segments each form a depression up to the margin of the guide groove.

12. The cutting tool defined in claim 10 wherein neighboring curved bottom segments are joined to each other at a sharp cutting edge.

13. The cutting tool defined in claim 1 wherein at least one circumferential cutting edge in conjunction with the flute runs primarily along the rotation axis and the flute is provided with recesses reaching into the circumferential cutting edge on at least one portion of its flanks and running transversely thereto.

14. The cutting tool defined in claim 13 wherein the transversely running grooves are formed by the wave troughs of a wave formed at least in the rake surface, with wave troughs and wave crests alternatingly formed in the flute.

15. The cutting tool defined in claim 13 wherein the height of the ribs over the depressions decreases starting from the middle of the flute at least up to a back surface thereof.

16. The cutting tool defined in claim 13 wherein the grooves serving as chip-breaking flutes have at least one side edge which in cutting direction runs approximately transversely with respect to the circumferential cutting edge.

17. The cutting tool defined in claim 13 wherein the chip-breaking flute or the groove has at least one lateral surface running transversely with respect to the direction of the flute and is of rectangular cross section.

18. A cutting tool in the form of a drill bit or end-milling tool comprising an elongated body formed with at least one cutting edge defined by a flank of a flute running primarily along a rotation axis of the body and having leading and trailing flanks one of which is formed with wavelike and spaced ribs and guide grooves, the depth of the grooves and height of the ribs increasing toward the cutting edge, the grooves being of trapezoidal shape seen axially.

* * * * *